(12) United States Patent
Helmstetter

(10) Patent No.: US 7,540,530 B2
(45) Date of Patent: Jun. 2, 2009

(54) GAS BAG MODULE AND VEHICLE STEERING WHEEL COMPRISING SUCH GAS BAG MODULE

(75) Inventor: Matthias Helmstetter, Aschaffenburg (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 905 days.

(21) Appl. No.: 10/690,236

(22) Filed: Oct. 21, 2003

(65) Prior Publication Data

US 2004/0084881 A1 May 6, 2004

(30) Foreign Application Priority Data

Oct. 30, 2002 (DE) .................... 202 16 754

(51) Int. Cl.
*B60R 21/203* (2006.01)

(52) U.S. Cl. .............. 280/731; 280/728.1; 280/728.2

(58) Field of Classification Search ............ 280/731, 280/728.1, 728.2
See application file for complete search history.

(56) References Cited

U.S. PATENT DOCUMENTS

| 5,118,133 | A | | 6/1992 | Zushi et al. | |
|---|---|---|---|---|---|
| 5,235,146 | A | * | 8/1993 | Suzuki | 200/61.54 |
| 5,327,796 | A | | 7/1994 | Ernst et al. | |
| 5,380,037 | A | * | 1/1995 | Worrell et al. | 280/728.2 |
| 5,427,405 | A | | 6/1995 | Kuretake et al. | |
| 5,431,438 | A | * | 7/1995 | Manabe | 280/731 |
| 5,685,557 | A | * | 11/1997 | Persson et al. | 280/728.2 |
| 5,899,487 | A | * | 5/1999 | Fischer | 280/728.3 |
| 6,086,090 | A | * | 7/2000 | Fischer | 280/728.2 |
| 6,354,622 | B1 | * | 3/2002 | Ulbrich et al. | 280/731 |
| 6,422,594 | B2 | * | 7/2002 | Hasebe | 280/731 |
| 6,688,638 | B2 | * | 2/2004 | Schutz | 280/728.2 |
| 6,849,816 | B2 | * | 2/2005 | Rumpf | 200/61.54 |
| 6,942,246 | B2 | * | 9/2005 | Hohne et al. | 280/731 |
| 2001/0002084 | A1 | | 5/2001 | Hudd et al. | |
| 2001/0052689 | A1 | * | 12/2001 | Adomeit et al. | 280/728.2 |

FOREIGN PATENT DOCUMENTS

| EP | 0841224 | 5/1998 |
|---|---|---|
| FR | 2790044 | 8/2000 |

* cited by examiner

*Primary Examiner*—John Q. Nguyen
*Assistant Examiner*—Barry Gooden, Jr.
(74) *Attorney, Agent, or Firm*—Tarolli, Sundheim, Covell & Tummino LLP

(57) ABSTRACT

A gas bag module (10) comprises a gas generator (16) and a generator carrier (12), to which the gas generator (16) is fastened and via which the gas generator (16) can be fastened directly or indirectly to a vehicle steering wheel (100). The generator carrier (12) consists at least partially of a multiple-component plastic (30, 32). There is further proposed a vehicle steering wheel (100) including such gas bag module (10).

8 Claims, 2 Drawing Sheets

GAS BAG MODULE AND VEHICLE STEERING WHEEL COMPRISING SUCH GAS BAG MODULE

TECHNICAL FIELD

The invention relates to a gas bag module comprising a gas generator and a generator carrier.

BACKGROUND OF THE INVENTION

A conventional gas bag module normally has a gas generator carrier to which the gas generator is fastened, and via which the gas generator can be fastened directly or indirectly to a vehicle steering wheel. The invention further relates to a vehicle steering wheel comprising such a gas bag module.

It is possible to manufacture generator carriers for fastening the gas generator entirely or partially from plastic.

The invention makes possible a favorably priced manufacture of a gas bag module which is particularly well matched to the requirements set.

BRIEF SUMMARY OF THE INVENTION

According to the invention, a gas bag module comprises a gas generator and a generator carrier, to which the gas generator is fastened and via which the gas generator can be fastened directly or indirectly to a vehicle steering wheel. The generator carrier consists at least partially of a multiple-component plastic wherein the components define different layers of the carrier. Thus, various material characteristics of different plastics can be utilized in an optimum manner. For example, through the introduction of an elastic component, in addition to a hard carrier component, a vibration-damping or noise-reducing effect (the latter to avoid rattling noises) can be achieved in a simple and favorably-priced manner.

The multiple-component sections or layers are preferably realized from a carrier material and a softer coating applied thereon wherein the layers are attached to each other at the large-surface boundary.

Quite generally, a generator carrier having multiple-component sections can also be adapted easily and flexibly to various requirements of different fields of use both as regards geometry and also as regards the vibration damping characteristics.

Preferably, the generator carrier forms the module housing which receives the gas generator and gas bag, so that an additional component can be dispensed with.

It is possible to form detent elements on the generator carrier, for connection of the gas bag module on the steering wheel side, preferably on a base section of the generator carrier. These detent elements advantageously consist of a multiple-component plastic with an elastic component and a separate stable carrier component. Through the use of a multiple-component material, both a noise- or vibration-damping and also the necessary high stability can be achieved in a simple manner.

In an advantageous embodiment of the invention, the generator carrier has a cup-shaped form with a depression (inside of the "cup") in which the gas generator is arranged. When the generator carrier forms the module housing, a wall of the depression preferably extends over a greater vertical extent than the generator, so that in addition a gas bag can be arranged in the depression. Cup-shaped means a body having a base from which a sidewall protrudes obliquely or under 90° with respect to the base. The side wall is preferably closed in a circumferential direction.

It is possible to design the depression such that a covering cap can be inserted into the depression, which closes to the exterior the generator carrier acting as module housing. This allows the gas generator and the gas bag to be arranged in a simple manner in the module housing and to then close the module housing by the covering cap so as to be dust-tight.

In a preferred embodiment of the invention, at least one laterally projecting section is constructed on the edge of the depression. The projecting section can surround the edge of the depression entirely or partially. On the projecting section, switches can be fastened which therefore have an arrangement relative to the covering cap which can be determined with close tolerances. In gas bag modules hitherto, numerous intermediate metal sheets were always provided between the switch and the covering cap, which caused a great cumulative tolerance and large gaps between switch and covering cap.

The gas bag module according to the invention is preferably used in a steering wheel according to the invention, in which the projecting section forms a part of the surface of the steering wheel which is visible from the outside, and advantageously covers a gap, which impairs the visual appearance of the steering wheel, formed between the gas bag module and the adjoining steering wheel skeleton encased in foam.

Preferably, the projecting section consists of a multiple-component plastic, e.g. in the form of a coating on a hard carrier material. The material of the coating is preferably a soft plastic which, depending on the desired purpose of use and appearance, can have a corresponding design and a corresponding tactile feel. The generator carrier, thus, has a layer construction, each layer being of one component.

The gas bag module can be fastened so as to be movable in the axial direction in the steering wheel and can be designed such that through the axial movement, a contact can be closed for actuating a horn. In this case, a generator carrier, the lateral edge of which continues into a visible section of the steering wheel, is particularly advantageous. A pressure onto the projecting section, taking place for actuating the horn, is transferred directly to a contact arranged for example in the region of the detent hooks, which brings about a considerable reduction of tolerances compared with known steering wheels, in which the vertical movement is passed on from the covering cap to the module housing. Furthermore, this results in a reduction in components.

DETAILED DESCRIPTION OF THE PREFERRED EMBODIMENTS

Figure 1:
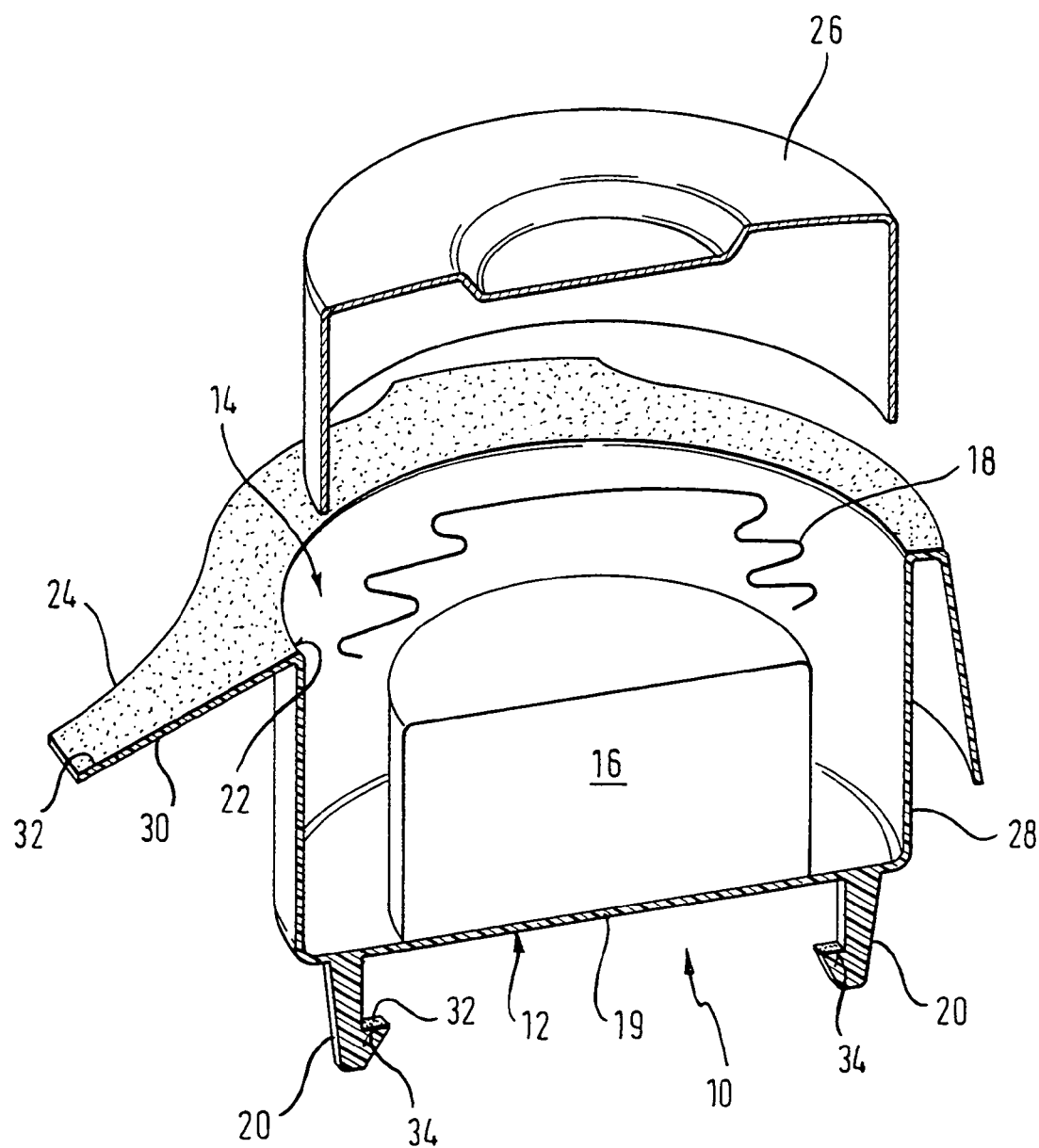
FIG. 1 shows a diagrammatic section through a gas bag module according to the invention.

The gas bag module 10 contains a generator carrier 12 which has a cup-shaped form with a depression (interior of the "cup") 14 in which a gas generator 16 and also a folded gas bag 18 (shown diagrammatically) are arranged. The cup-shaped portion of the carrier forms a receptacle for the gas generator 16. The gas generator 16 is fastened in the generator carrier 12 in a suitable known manner. In the example shown here, the module housing is formed entirely by the generator carrier 12. However, it is also possible to arrange the generator carrier 12 in a separate module housing which is fastened to the steering wheel.

On a base section 19 of the cup-shaped receptacle, detent elements 20 are formed on in one piece, by which the gas bag module 10 can be latched in place on a skeleton 21 of the steering wheel 100 (see FIG. 2), for example. The shape and construction of the detent elements 20 can be coordinated by the specialist in the art to the respective purpose of use. Preferably, the steering wheel 100 and the detent elements 20 are constructed such that the gas bag module 10 can be moved in the steering wheel 100 in axial direction for actuating a horn.

The depression 14 can be closed by a covering cap 26 which is pushed into the depression 14 with a press fit. The covering cap 26 is adapted in shape to the cross-section of the cup-shaped receptacle and has a rim 22 which in the state when placed in position projects into the depression 14 and then fixes the covering cap 26 on the generator carrier 12, for example by means of detent hooks 27 (see FIG. 2).

A laterally projecting section 24 which is constructed in one piece with the generator carrier 12 is formed in one piece with the rim 22 of the receptable.

Figure 2:
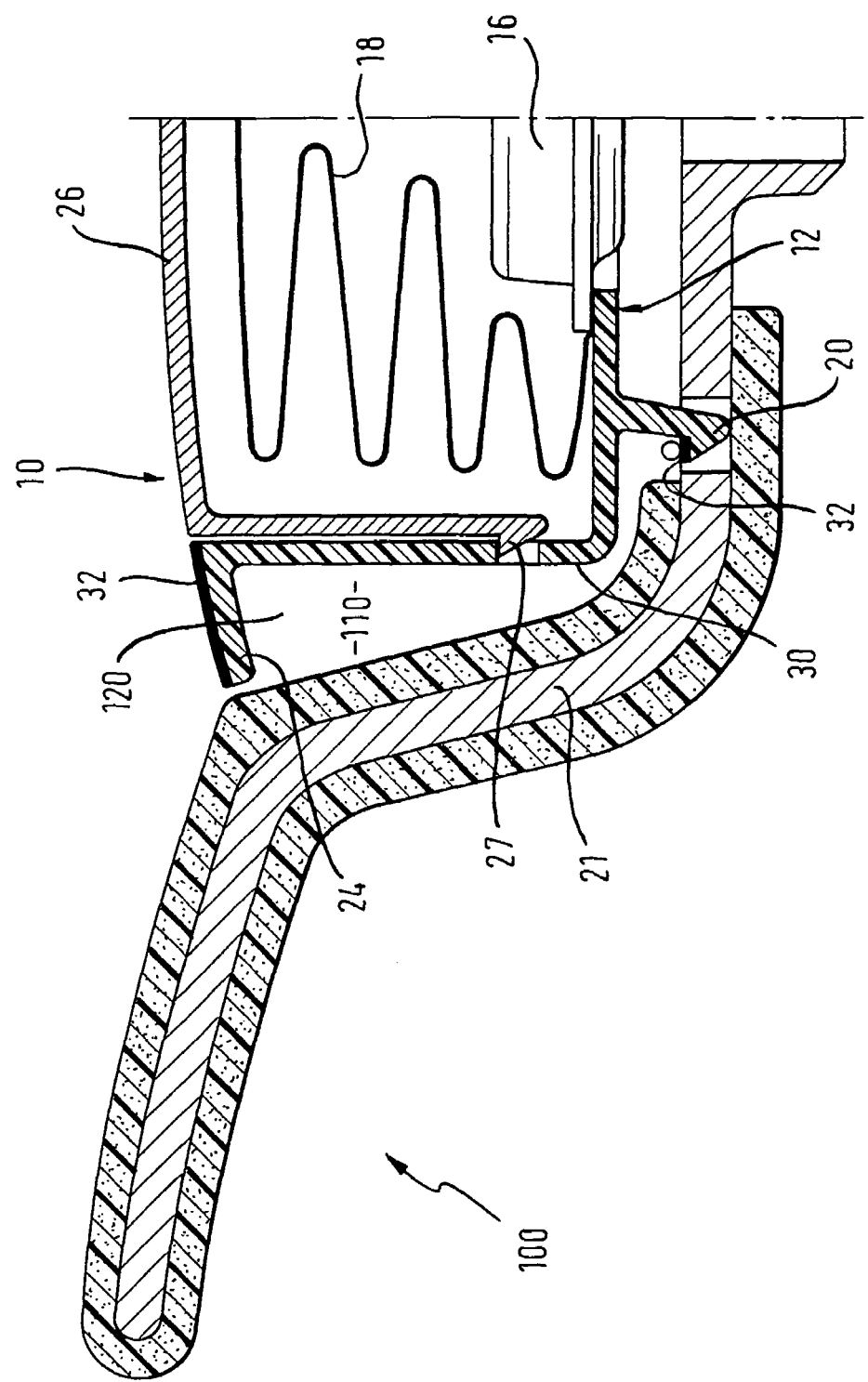
FIG. 2 shows a diagrammatic sectional view of a steering wheel according to the invention.

If the module 10 is inserted into a receiving space 110 of a steering wheel 100, as can be seen in FIG. 2, the laterally projecting section 24 forms a visible part of the exterior of the hub region of the steering wheel 100. The projecting section 24 is shaped corresponding to the geometry of the steering wheel 100 and has sections running along the spokes. The gap 120 formed between the wall 28 of the cup-shaped receptacle of the generator carrier 12 and the boundary of the receiving space 110 of the steering wheel 100 on the steering wheel side is covered to the exterior by the projecting section or sections 24.

The actuation of the horn takes place for example by pressure onto the laterally projecting section 24, the force being transferred directly onto the horn contacts via the single-piece generator carrier 12.

The generator carrier 12 consists in part of a two- or multiple-component plastic. In the embodiment shown here, the wall 28 and the base section 19 of the "cup" are formed from a hard plastic which ensures a high stability, e.g. from a glass fiber-reinforced polyamide-6, from polyethylene (PET), from polyoxymethylene (POM) or from another suitable material. In the detent elements 20 and the projecting section 24, on the other hand, such a hard plastic is used as carrier component 30 and coated with a softer plastic 32, e.g. a styrene-based plastic (e.g. SEBS), a thermoplastic urethane (TPU), a thermoplastic olefin or another suitable material. The generator carrier 12, thus, has a layer structure, each layer being defined by one of the components.

The material of the coating 32 is selected according to the function which is to be fulfilled. For the coating 32 of detent surfaces 34 of the detent hooks 20, a material is favorable which acts in a noise- and vibration-damping manner. For the coating 32 of the laterally projecting section 24, in turn, a material is advantageous which corresponds in feel, appearance and environmental stability to the desired characteristics for a visible surface of the steering wheel.

The generator carrier 12 forms a single-piece component 30 with the detent hooks 20 and the projecting section or sections 24, the non-coated sections preferably consisting entirely of the carrier component. The coating 32 of the respective parts of the generator carrier 12 preferably consists of a thin layer which can be applied over a large area.

The invention claimed is:

1. A gas bag module (10), comprising a gas generator (16) and a generator carrier (12), to which said gas generator (16) is fastened, said generator carrier (12) being adapted to be fastened to a vehicle steering wheel (100),
    said generator carrier (12) having a base section (19) with detent elements (20) formed thereon, by means of which detent elements said generator carrier (12) can be fastened on a steering wheel side,
    characterized in that said generator carrier (12) comprises a multiple-component plastic (30, 32), said multiple-component plastic comprising different layers of said carrier (12), and
    said detent elements (20) comprising said multiple-component plastic (30, 32).

2. The gas bag module (10) according to claim 1, characterized in that said multiple-component plastic comprises a carrier material (30) and a coating (32).

3. The gas bag module (10) according to claim 1, characterized in that said generator carrier (12) has a cup-shaped construction with a depression (14) in which said gas generator (16) is arranged.

4. The gas bag module (10) according to claim 3, characterized in that a covering cap (26) is provided, which can be inserted into said depression (14), and that said depression (14) is constructed such that said covering cap (26) closes said generator carrier (12) externally.

5. The gas bag module (10) according to claim 3, characterized in that said depression (14) has an edge (22) with at least one section (24) formed thereon so as to project laterally.

6. The gas bag module (10) according to claim 5, characterized in that said projecting section (24) comprises said multiple-component plastic (30, 32).

7. The gas bag module according to claim 6 wherein said projecting section is one piece.

8. A gas bag module (10), comprising:
    a gas generator (16) and
    a generator carrier (12), to which said gas generator (16) is fastened, said generator carrier (12) being adapted to be fastened to a vehicle steering wheel (100), said generator carrier (12) comprising a multiple-component plastic (30, 32), said multiple-component plastic defining different layers of said carrier (12), said generator carrier (12) having a cup-shaped construction with a depression (14) in which said gas generator (16) is arranged, and
    a covering cap (26) being provided, which can be inserted into said depression (14), said depression having a rim (22), said depression (14) being constructed such that said covering cap (26) closes said generator carrier (12) externally, said covering including an upper portion, said upper portion being flat and flushed with an upper portion of said rim (22).

* * * * *